US005597545A

United States Patent [19]

Chang et al.

[11] Patent Number: 5,597,545
[45] Date of Patent: Jan. 28, 1997

[54] RECOVERY OF HF FROM AQUEOUS STREAMS

[75] Inventors: Chin-Hsiung Chang, Palatine; Miguel A. Gualdron, Skokie, both of Ill.

[73] Assignee: AlliedSignal Inc., Morris County, N.J.

[21] Appl. No.: 338,935

[22] Filed: Nov. 14, 1994

[51] Int. Cl.$^6$ ........................................ C01B 7/19
[52] U.S. Cl. ........................ 423/484; 423/483; 423/488; 95/131
[58] Field of Search ...................... 95/131, 903; 423/483, 423/488, 240 S, 484; 210/915, 672; 502/56

[56] References Cited

U.S. PATENT DOCUMENTS

| | | | |
|---|---|---|---|
| 3,338,673 | 8/1967 | Peterson et al. | 23/153 |
| 3,711,596 | 1/1973 | Hartig | 423/483 |
| 3,947,558 | 3/1976 | van Eijl | 423/483 |
| 3,976,447 | 8/1976 | Merchant et al. | 423/488 |
| 4,154,804 | 5/1979 | Walker et al. | 423/240 |
| 4,163,045 | 7/1979 | Van der Meer et al. | 423/483 |
| 4,389,293 | 6/1983 | Mani et al. | 204/180 |
| 4,557,921 | 12/1985 | Kirsch et al. | 95/131 |
| 4,685,940 | 8/1987 | Soffer et al. | 423/447.1 |
| 4,769,180 | 9/1988 | Echigo et al. | 252/631 |
| 4,820,681 | 4/1989 | Chang et al. | 423/445 R |
| 4,882,134 | 11/1989 | Mizrahi | 423/356 |
| 4,902,312 | 2/1990 | Chang | 55/71 |
| 5,241,113 | 8/1993 | Jacobson | 562/543 |
| 5,261,948 | 11/1993 | Foley et al. | 95/903 |
| 5,268,122 | 12/1993 | Rao et al. | 252/171 |
| 5,268,343 | 12/1993 | Hopp et al. | 502/56 |
| 5,281,318 | 1/1994 | Tahara | 204/182.4 |
| 5,405,812 | 4/1995 | Bruggendick | 502/56 |

FOREIGN PATENT DOCUMENTS

| | | |
|---|---|---|
| 3113905 | 10/1982 | Germany . |
| 54032190 | 3/1979 | Japan . |
| 87031994 | 7/1987 | Japan . |
| 06144805 | 5/1994 | Japan . |
| 665932 | 6/1979 | U.S.S.R. ................ 95/131 |
| 1662644 | 7/1991 | U.S.S.R. . |
| WO9419299A1 | 9/1994 | WIPO . |

OTHER PUBLICATIONS

Chemical Abstracts, vol. 85, #80401 (1976), from Ref. zh., Khim., 1976, Abstr. No. 81711.

Primary Examiner—Michael Lewis
Assistant Examiner—Peter T. DiMauro
Attorney, Agent, or Firm—Harold N. Wells

[57] ABSTRACT

HF can be recovered from aqueous streams, particularly those which are dilute and have a concentration of HF lower than the azeotrope between HF and water. Such aqueous streams are contacted with carbon molecular sieves, preferably those having an average pore size of about 3.5 Angstroms, which adsorb both HF and water. When regenerated by heating, more dilute aqueous streams are desorbed at lower temperatures, followed by desorption of HF which is free of water, making possible a separation of HF and water and avoiding formation of the azeotrope.

10 Claims, No Drawings

RECOVERY OF HF FROM AQUEOUS STREAMS

BACKGROUND OF THE INVENTION

This invention relates generally to the recovery of hydrogen fluoride (HF) from aqueous streams. More particularly it relates to a process for removing HF from dilute aqueous streams and recovering concentrated HF.

HF is widely used in industry. For example, owing to its very reactive nature it can be used to react with silica and therefore is employed in removal of sand from metal castings and in polishing or etching glass, it is also used to introduce fluorine atoms into hydrocarbons and polymers, for separating uranium isotopes, for flotation of ores, and in the petroleum and petrochemical industries as an alkylation catalyst. As might be expected, waste waters from such processes may contain small quantities of HF and they represent environmental cleanup problems. If HF could be removed from these streams, their disposal would be made easier and less expensive. However, if the HF could be recovered in a concentrated form, it could be reused.

The concentration of HF in water is made difficult by the fact that the two compounds are strongly bound together and an azeotrope is formed, having a concentration of about 38 wt. % HF and 62 wt. % water. Thus, it is not possible to simply distill a dilute solution of HF to concentrate it beyond that point. Methods to bypass the azeotropic concentration must be used, which involve the use of sulfuric acid to remove water or chemicals to complex HF. It would be particularly advantageous if HF could be concentrated without employing such methods.

The recovery of HF has been the subject of interest in many patents. For example, it has been proposed that HF be removed from aqueous solutions by an anion exchange resin and then displaced from the resin by another halogen hydride. Alternatively, it has been reported that HF may be extracted from solutions using a water-immiscible amine-containing extractant. Another method of recovering HF is to use electrodialysis.

In U.S. Pat. No. 4,902,312 recovery of small amounts of HF and HCl from chlorofluorocarbons by adsorption is disclosed to be feasible using carbon molecular sieves having a narrow pore size centered at 3.5 Angstroms. In examples of the process the HF is adsorbed from chlorodifluoromethane, which is a much larger size molecule. However, if such carbon molecular sieves are used to remove HF in the presence of water, the water molecules are not excluded by pore size and both molecules are adsorbed.

Thus, it is not immediately evident that a significant separation of HF and water would be possible. However, the inventors have found that it is possible to remove HF from aqueous solutions and also that surprisingly, it is possible to concentrate the HF when the carbon molecular sieves are regenerated.

SUMMARY OF THE INVENTION

The invention provides a process for the recovery of HF from aqueous streams, particularly from those which are dilute and have concentrations of HF below that of the azeotrope. Both HF and water are adsorbed in the pores of a carbon molecular sieve. In a preferred embodiment the carbon molecular sieves will have an average pore size of about 3.5 Angstroms. Such carbon molecular sieves adsorb HF and water in proportions different from those of the initial aqueous streams and provide some increase in HF concentration. However, when the carbon molecular sieves are regenerated by heating, the water is removed first and contains less HF than was in the original solution. Further heating to a higher temperature causes desorption of the HF in the substantial absence of water so that the desorbed HF can be recovered in essentially pure form. The azeotrope between HF and water is avoided, so that the products recovered are a dilute HF-water solution and substantially pure HF. The process can be repeated using the dilute HF-water solution as the feed to the carbon molecular sieves to remove the residual HF.

Although various polymers may serve as sources, the carbon molecular sieves preferably are made by pyrolyzing polyacrylonitrile under conditions which produce pores of the desired size and are especially effective for recovery of HF from aqueous streams. The polyacrylonitrile preferably is pyrolyzed to a carbon molecular sieve in the presence of an inert gas raising temperatures according to the following program:

(1) increase from 25° to 220° C. over 2 hours,
(2) increase from 220° to 440° C. over 2 hours,
(3) increase from 440° C. to 500° C. over ½ hour,
(4) hold 500° C. for 1½ hours,
(5) cool from 500° C. to 25° C. over 1 hour.

In one embodiment, the invention is a carbon molecular sieve derived from pyrolysis of acrylonitrile according to the above schedule.

DESCRIPTION OF THE PREFERRED EMBODIMENTS

Carbon Molecular Sieves

Carbon molecular sieves are available commercially. They are usually derived from natural sources such as coal or waste materials from the manufacture of Saran.

The carbon molecular sieves used for the removal of HF from aqueous solutions may be produced by methods described in U.S. Pat. No. 4,902,312. This method of manufacturing may be broadly characterized as comprising three steps: (1) polymerization of an oxygen-free monomer, optionally, in the presence of an oxygen-free cross-linking agent; (2) forming particles of the resultant polymer into a desired shape; and then, (3) carbonizing the shaped material in a substantially oxygen-free environment.

The monomer can be chosen from a number of potential compounds. They should be readily polymerizable and essentially free of oxygen in their molecular structure. Among the materials which may be employed as the monomer are acrylonitrile (AN), vinylidene fluoride (PVDF), chlorotrifluoroethylene (HALAR), vinylidene chloride (PVDC), mixtures of two or more monomers such as mixtures of vinylidene chloride and vinyl chloride, vinylidene chloride and acrylonitrile, and a mixture of styrene and divinylbenzene. Other monomers which may have application in the subject invention are vinyl fluoride, vinyl bromide, chlorinated ethylene, chlorofluorethylene, vinyl chlorobenzene, vinylidene bromide and vinylidene-fluoride-chlorotrifluoroethylene. The preferred monomer is acrylonitrile.

Polymerization reactions may be performed according to a number of different procedures known in the art and described below. However, emulsion polymerization or suspension polymerization is preferred.

Bulk polymerization is the direct conversion of liquid monomer to polymer in a reaction system in which the polymer remains soluble in its own monomer.

Solution polymerization is a method in which a solvent is used capable of dissolving the monomer, the polymer, and the polymerization initiator.

In suspension polymerization, the monomer is dispersed rather than dissolved in the medium with water being a typical suspension medium. The initiator is dissolved in the monomer, the monomer is dispersed in water, and a dispersing agent such as hydroxypropyl methyl cellulose is incorporated in amounts of 0.1–2% to stabilize the suspension formed. The monomer droplets are generally on the order of approximately 0.1–1.0 millimeter in size.

In emulsion polymerization, the polymerization is within a suspended particle of colloidal size of approximately 50 to 1500 Angstroms in diameter. The initiator is normally found in the aqueous phase and not within the monomer particles.

Promoted cross-linking is optional. The polymers produced in the initial polymerization step could be cross-linked with a substantially oxygen-free cross-linking agent. The crosslinking agent will typically be present during the polymerization at a concentration equal to less than 10 mole percent of the monomer. A preferred cross-linking agent is divinylbenzene. Other crosslinking agents include trivinyl benzene, divinyl acetylene, and divinyl sulfide.

For the production of carbon molecular sieves from polymers containing no oxygen atoms, the polymerization initiator also is preferably an oxygen-free compound. Therefore, a carbon or azo rather than an oxygen initiator is preferably used. One suitable non-oxygen containing initiator is 2,2'-azobis(isobutyronitrile), (AIBN), which has a molecular formula of $C_8H_{12}N_4$—. Another highly suitable polymerization initiator is the compound 2,2' azobis (2,4-dimethylvaleronitrile) which is available from DuPont Chemical Company and is sold under the trade VAZO 52. The formula of the latter compound is $Ci_4H_{24}N_4$—.

If the precursor polymer is produced by solution polymerization, a number of different solvents may be employed. Typical solvents include normal hexane, chloroform, carbon tetrachloride, orthodichlorobenzene, and 1,1,2,2-tetrachloroethane. Of these materials, orthodichlorobenzene and 1,1,2,2-tetrachloroethane are preferred. General characteristics for the selection of a solvent include a high-solubility for the monomer, the absence of oxygen from the molecular structure, and a large difference in boiling point between the solvent and the monomer. A weight ratio between monomer and solvent between 1:1 to 1:2 will normally be suitable.

The material formed by the polymerization may be obtained in a number of different forms such as one or more large masses formed within a reactor or a large number of smaller particles. For ease in fabricating the polymer into a desired shape it is preferably reduced in size to small free-flowing granules or powder. These granules are then shaped or formed into a desired configuration such as a cylinder, sphere, pellets, and the like. This shaping or forming may be done by conventional means familiar to those skilled in the art.

The shaped polymeric material is carbonized by heating it to a high temperature in an essentially oxygen-free environment. The concentration of oxygen in the atmosphere surrounding the particles undergoing carbonization should be less than 0.1 mole percent and preferably less than 0.05 mole percent. The carbonization will result in the evolution of a hydrogen halide or other gases. Preferably an inert gas should be flowing at a sufficient rate to remove these materials from the particles. In some cases, prior to high temperature carbonization the shaped polymer precursor material is subjected to a mild heating step during which its temperature is raised above 150° C., e.g. 240° C., and held at this temperature until no more weight loss occurs. The shaped material is then preferably subjected to a programmed temperature increase to a maximum temperature. With some polymers, this maximum temperature is above 700° C., preferably above 800° C., particularly, above 900° C. For the preferred polyacrylonitrile a maximum temperature of about 500° C. has been found to be sufficient. The temperature of the shaped precursor material is preferably raised at a rate greater than 50° C. per hour but less than 200° C. per hour preferably 75°–125° C. per hour. Also, it is preferred to hold the shaped material at the final high temperature for a period of at least 45 minutes and preferably for at least one hour.

A preferred heating schedule for use with polyacrylonitrile is the following:

(1) increase from 25° to 220° C. over 2 hours,
(2) increase from 220° to 440° C. over 2 hours,
(3) increase from 440° C. to 500° C. over ½ hour,
(4) hold 500° C. for 1½ hours,
(5) cool from 500° C. to 25° C. over 1 hour.

It will be understood that adjustments to the above heating schedule may provide improved performance and optimize the carbon molecular sieve properties.

The sieve precursors are derived from polymeric materials which are substantially free of the inorganic materials such as metals and inorganic oxides which may be present when the precursor material is made from a naturally occurring substance such as coal, coconut shells, peat, or wood. If a binder is used prior to carbonization the product will normally have impurities derived from the binder in addition to impurities present in the precursor materials. The preferred sieves, on a hydrogen- and oxygen-free basis, should contain at least 99.5 wt. % carbon and preferably at least 99.8 wt. % carbon.

While the just described method produces a unique and useful carbon molecular sieve, the average pore size may not be optimum and accordingly, it may be further treated to reduce the pore size or to increase it to meet the desired size range. Various techniques may be used to reduce the pore size, such as the deposition of carbon with hydrocarbons at high temperature. One preferred method is the deposition of carbon with toluene at about 800° C. The pore size may be increased by reacting the carbon with steam, carbon dioxide, or oxygen. It is believed that the carbon molecular sieves produced by the above heating schedule have an average pore size of about 3.5 Angstroms which is suitable for adsorption of HF and therefore further adjustment of the pore size is not essential.

HF Removal from Aqueous Streams

Aqueous waste streams from processes which employ HF may contain up to about 50 wt. % HF, typically aqueous streams which may be treated for HF recovery according to the invention will contain about 2 to 50 wt. % HF although the process could be applied to more concentrated solutions if desired. Clearly, the aggressive nature of HF makes its recovery by adsorption difficult. However, the carbon molecular sieves described above, which are preferred, as well as certain other carbon molecular sieves having the suitable average pore size can be used to adsorb both hydrogen fluoride and water and to separate them during regeneration.

The carbon molecular sieves which are useful in recovery of HF preferably will have an average pore size of about 3.5 Angstroms. It will be understood by those skilled in the art that measurement of average pore size is difficult. Consequently, in many uses the average pore size is inferred from the separations which are observed. In the present instance, the size of the molecules being adsorbed are uncertain since it is known that HF molecules associate both with themselves and with water molecules. It may be that the ability of the carbon molecular sieves to separate HF and water is relative to the related strengths of inter-molecular and surface-molecular bonding.

Although various methods of contacting the aqueous streams with carbon molecular sieves are feasible, e.g. employing fluidized or moving beds, passing the aqueous stream over a fixed bed of carbon molecular sieve particles is preferred. In such a process the liquid space velocity would be in the range of about 5 to 20 $hr^{-1}$, preferably 10 to 15 $hr^{-1}$.

The shape of the bed and the size of the particles will be determined by various factors familiar to those skilled in the art. The pressure generally could be between about 100 and 200 kPa, but about 100 to 150 kPa would be preferred. The temperature of the adsorption process will be about 10° C. to 30° C., particularly 20° C. to 25° C.

HF Recovery

It has been found that carbon molecular sieves meeting the criteria described above can be regenerated by heating, either using an inert gas or vacuum to remove the water and HF. As has been previously mentioned, the carbon molecular sieves will adsorb both HF and water, that is the two molecules are not separated to a significant degree, as would be typical of a separation based on molecular size. HF is known to bond to water molecules in a one to two ratio and it is also known to associate with other HF molecules. Adsorption from dilute solutions will be shown in the examples below. The amount of water adsorbed is greatly in excess of the amount of HF adsorbed and the ratio is below that of the azeotropic composition, so that one might expect that when the carbon molecular sieve is regenerated that a dilute solution of HF in water would be obtained. Any separation obtained by differential adsorption might be expected to be small and several steps of adsorption-desorption would be needed to provide a solution concentrated to the azeotrope at the maximum. However, the inventors have discovered that regeneration of the carbon molecular sieves of the invention produces a separation of HF from water so that HF solutions having concentrations greater than the azeotrope or even substantially pure HF are possible.

The reason for this unexpected separation of HF and water during desorption is not fully understood, but it is believed that the bond of HF to the carbon molecular sieves is much stronger than water to the carbon or the bond of the HF to the water molecules. Thus, with the application of heat, the water is found to come off at temperatures in the range of 70° C. to 150° C. depending on the pressure, with only small amounts of HF. Then, after the water has been removed, the temperature can be increased to temperatures up to about 275° C. depending on the pressure, and the HF removed with little or no water present. Thus, during regeneration of the carbon molecular sieves a dilute solution of HF in the pores of the sieves can be converted into two solutions, one more dilute in HF and the other essentially pure HF. It can be calculated based on the results of the small batch experiments to be shown in the examples below, that with optimum conditions, it should be possible to separate an aqueous solution containing say 10 wt. % HF into two solutions, one containing 3 wt. % HF and the other 100 wt. % HF.

Generally, a bed of carbon molecular sieves would be heated by passing a steam of an inert gas over it at a temperature suitable for removal of the water, preferably about 70° C. to 150° C. depending on the pressure, for a period of time sufficient to remove most of the water but without removing much of the HF. The water could be removed by cooling and condensing it from the inert gas stream, which could then be recycled to the bed to remove more water. After completing this step, the gas could be heated to a temperature suitable for removing the HF, typically about 150° C. to 225° C. depending on the pressure. Again, the gas could be cooled to condense and separate the HF and recycled to the bed. If a stripping gas is used, the pressure typically would be maintained slightly above atmospheric pressure such as about 2 psig (115 kPa absolute). While the use of stripping gas would provide advantages, it is possible to remove the gases which are generated by heating the bed (indirectly in this case) and employing a vacuum instead. In such a situation, the vacuum preferably would be about 0.5 to 1.0 kPa absolute. It will be appreciated by those skilled in the art that selection of the conditions and means used for heating the bed and removing the desorbed gases is a matter for detailed engineering design rather than an essential aspect of the invention.

EXAMPLE 1

Powdered polyacrylonitrile (DuPont) was pressed into ⅜"×⅜" cylindrical pellets (9.5 mm×9.5 mm), which were placed in a vessel through which nitrogen was passed and heated to a maximum temperature of 500° C. according to the following schedule. The temperature was raised from ambient to 220° C., over a two-hour period, then to 440° C. over another two-hour period, and finally to 500° C. over one-half hour. The pellets were held at 500° C. for one and a half hours and then cooled to room temperature over one hour. the pyrolyzed pellets were ready for use in the adsorption of HF without further adjustment of the pore size.

EXAMPLE 2

Several carbons were tested for their ability to adsorb HF from water solutions. A commercially available carbon molecular sieve and four carbon molecular sieves made by methods discussed above and having different mean pore sizes were compared by placing the carbon molecular sieves into a 25 mL container with 10 mL of about 10 wt. % HF solution and measuring the concentration of the solution after at least one hour exposure. The HF adsorbed by the carbon was calculated. The following table summarizes the results.

TABLE A

| Adsorbent | Weight (gram) | HF Concentration (%, wt.) | | BF Loading (wt. %) |
|---|---|---|---|---|
| | | Starting | Final | |
| Takeda MSC 3A | 2.00 | 11.90 | 11.42 | 2.47 |
| AlliedSignal A | 2.00 | 11.90 | 10.51 | 7.16 |
| AlliedSignal B | 4.60 | 10.08 | 8.54 | 3.45 |
| AlliedSignal C | 5.06 | 10.08 | 8.90 | 2.40 |

TABLE A-continued

| Adsorbent | Weight (gram) | HF Concentration (%, wt.) | | BF Loading (wt. %) |
|---|---|---|---|---|
| | | Starting | Final | |
| AlliedSignal D | 2.00 | 11.90 | 10.51 | 7.16 |
| AlliedSignal D | 5.08 | 10.08 | 7.86 | 4.50 |

A was prepared by carbonizing a co-polymer of vinylidene chloride and acrylonitrile at 700° C.

B was prepared by carbonizing poly acrylonitrile at 550° C.

C was prepared by carbonizing poly vinylidene chloride at 745° C.

D was prepared by carbonizing poly acrylonitrile at 550° C.

The results indicate that carbon molecular sieves vary in their ability to absorb HF. It was found that D reached equilibrium more rapidly and had the highest capacity and so was selected for further evaluation.

EXAMPLE 3

The carbon molecular sieve designated D in Example 2 was tested using different proportions of the absorbent and different HF concentrations. The results are shown in the following table.

TABLE B

Results of Isotherm Measurements on AlliedSignal D at 25° C.

| Absorbent | BF Concentration (%, wt) | | HF |
|---|---|---|---|
| Wt.(g) | Starting | Final | Loading (wt. %) |
| 2.00 | 11.90 | 10.51 | 7.16 |
| 5.08 | 10.08 | 7.86 | 4.50 |
| 3.94 | 46.85 | 42.99 | 11.76 |
| 6.03 | 46.85 | 39.44 | 14.74 |
| 4.11 | 20.87 | 16.73 | 10.83 |
| 6.17 | 20.87 | 15.32 | 9.67 |
| 4.06 | 16.57 | 12.74 | 9.72 |

The results suggest that there is a maximum HF loading but that this is achieved with relatively high HF concentrations. Within the region of relatively dilute solutions the loading appears to be directly proportional to the HF concentration.

EXAMPLE 4

The test used above was repeated using the preferred carbon molecular sieve D but 2000 ppm of total organics from alkylation waste water. The results showed an HF loading of about 4.7 wt. % with a final HF concentration of about 4.6 wt. %, which is consistent with the previous results and suggesting that the presence of organic materials had little effect on the ability of the carbon molecules sieve to adsorb HF.

EXAMPLE 5

The carbon molecular sieve samples containing HF from the tests of Example 3 were combined and then regenerated by placing them (38.4 g) in a 40 mL bed (2.7 cm I.D. by 7 cm long). Helium gas was passed upward through this bed at a rate of 40 mL/min and the bed was heated to 120° C. by an external electrical heater. After 2.5 hours 1.77 g of HF had been recovered which corresponded to about 7.6 wt. % based on the carbon. It was concluded that substantially all of the HF had been removed.

After the regeneration, the carbon was ground to 8–10 mesh size. 6.338 g of the ground carbon was packed into a Teflon column (9 mL volume; 0.8 cm. I.D. by 18 cm. long). Water was introduced at a rate of 1.5 mL/min and then a feed solution containing 6.98 wt. % HF and 2000 ppm total organics was passed over the bed at about the same rate. The concentration of the exiting solution remained low for some time and then the HF broke through and quickly climbed to a high value, as will be seen in the following table.

TABLE C

Breakthrough Test on Regenerated AlliedSignal Carbon Molecular Sieve D at Room Temperature (Teflon Column: 9 mL)

| Time (min.) | Average flow rate (mL/min) | Total Feed (mL) | Bed Volume | HF Concentration (%) |
|---|---|---|---|---|
| 1 | 1.67 | 1.69 | 0.188 | 0.49 |
| 2 | 1.31 | 2.98 | 0.331 | 0.31 |
| 3 | 1.31 | 4.29 | 0.477 | 0.30 |
| 4 | 1.39 | 5.68 | 0.631 | 0.21 |
| 5 | 1.36 | 7.04 | 0.782 | 0.20 |
| 6 | 1.36 | 8.40 | 0.933 | 0.20 |
| 7 | 1.38 | 9.78 | 1.087 | 0.26 |
| 8 | 1.52 | 11.30 | 1.256 | 0.88 |
| 9 | 1.27 | 12.57 | 1.397 | 2.49 |
| 10 | 1.49 | 14.06 | 1.562 | 3.05 |
| 11 | 1.68 | 15.74 | 1.749 | 4.37 |
| 12 | 1.25 | 16.99 | 1.888 | 4.78 |
| 13 | 1.54 | 18.53 | 2.059 | 5.46 |
| 14 | 1.46 | 19.99 | 2.221 | 4.98 |
| 15 | 1.53 | 21.52 | 2.391 | 5.00 |
| 16 | 1.48 | 23.00 | 2.556 | 5.20 |
| 17 | 1.53 | 24.53 | 2.726 | 5.26 |
| 18 | 1.51 | 26.04 | 2.893 | 5.08 |
| 19 | 1.53 | 27.57 | 3.063 | 5.04 |

It was found that the carbon molecular sieve had gained 7.81 g of HF.

EXAMPLE 6

Another breakthrough test was carried out in which a 75 mL Teflon coated stainless steel cylinder was packed with 46.8 g of the preferred carbon molecular sieve of Example 2, ground to 12–20 mesh. A feed containing 10 wt. % HF was passed through the column at 1.5 g/min. After about 7 g had passed through the column, breakthrough occurred. The test was continued until about 45 g. had passed through and the effluent contained about 6 wt. % HF. The carbon was found to have gained 26.61 g.

The carbon was purged by passing helium at 40 mL/min through the column while the column was being heated. The temperature was held at 100° C., 140° C., 150° C., 170° C., 190° C., 200° C., and finally at 220° C. The HF and water driven off at each temperature were collected in water and analyzed, with the following results.

TABLE D

Desorption of HF and H$_2$O from AlliedSignal Carbon Adsorbent

| Desorption step | Temp. (°C.) | Duration (min.) | Total Wt. Desorbed (g) | HF Desorbed (g) | H$_2$O Desorbed (g) | % HF |
|---|---|---|---|---|---|---|
| 1 | 25  | 68  | 1.5   | 0.08 | 1.42  | 5   |
| 2 | 100 | 90  | 10.10 | 0.17 | 9.93  | 2   |
| 3 | 140 | 120 | 11.80 | 0.14 | 11.66 | 1   |
| 4 | 150 | 105 | 0.52  | 0.14 | 0.38  | 27  |
| 5 | 170 | 89  | 0.48  | 0.48 | 0     | 100 |
| 6 | 190 | 120 | 1.38  | 1.38 | 0     | 100 |
| 7 | 200 | 90  | 0.27  | 0.27 | 0     | 100 |
| 8 | 220 | 90  | 0.56  | 0.56 | 0     | 100 |

It can be seen that the water is desorbed at about its boiling point and above. Only a small amount of HF is removed. Thereafter, the HF is removed and above about 150° C. the HF is substantially pure. Consequently, it is possible to separate HF from water during regeneration of the carbon

EXAMPLE 7

The test of Example 6 was repeated except that 48.5 g of the carbon molecular sieve was used and the regeneration temperatures were 25° C., 100° C., 150° C., 170° C., 190° C., 210° C., and 220° C. Again, the water was selectively desorbed first, followed by the HF. These results are summarized in the following table.

TABLE E

| | % Desorbed | | |
|---|---|---|---|
| Temp. °C. | H$_2$O | HF | % HF |
| 25  | 10 | 5  | 8   |
| 100 | 28 | 5  | 3   |
| 140 | 57 | 2  | 1   |
| 150 | 3  | 8  | 34  |
| 170 | 2  | 12 | 57  |
| 190 | —  | 28 | 100 |
| 210 | —  | 13 | 100 |
| 220 | —  | 29 | 100 |

EXAMPLE 8

Comparative

The procedure of Examples 6 and 7 was repeated using 43.8 g of the commercial carbon molecular sieve tested in Example 2 (Takeda MSC-3A). The results are summarized in the following table.

TABLE F

| | % Desorbed | | |
|---|---|---|---|
| Temp. °C. | H$_2$O | HF | % HF |
| 25  | 21 | 17 | 7   |
| 100 | 18 | 3  | 2   |
| 140 | 45 | 17 | 2   |
| 150 | 12 | 18 | 12  |
| 170 | 4  | 11 | 21  |
| 190 | —  | 13 | 100 |
| 210 | —  | 19 | 100 |
| 220 | —  | 4  | 100 |

It can be seen that with the Takeda carbon that the HF and water separated when desorbed as was found with the carbon molecular sieves of the invention, although the Takeda carbon appeared to release HF more evenly over the regeneration temperatures than does the preferred carbon molecular sieves.

EXAMPLE 9

Comparative

The experiment of Example 8 was repeated. The results were similar to those first found. A summary of the results of Examples 6–9 are given in the following table.

TABLE G

Desorption Efficiencies for AHF Recovery

| | ASRT Ex. 6 | ASRT Ex. 7 | Takeda Ex. 8 | Takeda Ex. 9 |
|---|---|---|---|---|
| Total HF Recovery, g | 3.22 | 4.27 | 2.24 | 2.04 |
| AHF[a] Recovered, g | 2.69 | 2.98 | 0.69 | 0.96 |
| ABF Efficiency, (ABF/Carbon, g/g) | 0.058 | 0.061 | 0.016 | 0.022 |
| ABF/Total HF (%) | 83.5 | 70.8 | 30.8 | 47.1 |

[a] AHF = anhydrous HF

It can be seen that, although the commercial carbon molecular sieve is able to recover anhydrous HF, the preferred carbon molecular sieve, derived from polyacrylonitile provides superior recovery and separation of HF from water.

We claim:

1. A method of recovering HF from aqueous streams comprising the steps of:
   (a) contacting said aqueous stream containing HF with a carbon molecular sieve and adsorbing both HF and water in pores of said carbon molecular sieve;
   (b) heating said carbon molecular sieve containing substantially all the HF adsorbed in step (a), and water adsorbed in step (a) to at least a first temperature higher than the contacting of step (a) and removing water and HF desorbed at said temperature until substantially all of said water has been removed;
   (c) heating said carbon molecular sieve after step (b) to at least a second temperature higher than said first temperature and removing substantially pure HF desorbed at said second temperature; and
   (d) separately recovering the water and HF desorbed in step (b) and the substantially pure HF desorbed in step (c).

2. A method of claim 1 wherein said aqueous stream contains up to about 50 wt. % HF.

3. A method of claim 2 wherein said aqueous stream contains less than the azeotropic amount of HF.

4. A method of claim 1 where said carbon molecular sieve has an average pore size of about 3.5 Angstroms.

5. A method of claim 1 wherein said carbon molecular sieve is the pyrolysis product of polyacrylonitrile.

6. A method of claim 5 wherein said pyrolysis is controlled to produce an average pore size effective to adsorb both HF and water.

7. A method of claim 6 wherein said polyacrylonitrile is pyrolyzed to produce said average pore size in the presence of an inert gas by a heating process comprising the steps of:
   (a) heating said polyacrylonitrile from 25° C. to 220° C. over 2 hours, then (b) heating said polyacrylonitrile from 220° C. to 440° C. over 2 hours, then (c) heating said polyacrylonitrile from 440° C. to 500° C. over ½ hour, then (d) holding said acrylonitrile at 500° C. over ½ hour, then (e) cooling from 500° C. to 25° C. over 1 hour.

8. A method of claim 1 wherein said contacting of step (a) is carried out in a fixed bed of said carbon molecular sieve and said aqueous stream is passed over said bed at a temperature of 10° C. to 30° C. and a liquid hourly space velocity of about 5 to 20 $hr^{-1}$.

9. A method of claim 1 wherein the heating of step (b) is carried out at a temperature of about 70° C. to 150° C. and a pressure between about 0.5 to 115 kPa absolute.

10. A method of claim 1 wherein the heating of step (c) is carried out at a temperature of about 150° C. to 275° C. and a pressure between about 0.5 to 115 kPa absolute.

* * * * *